US011879806B2

(12) United States Patent
Kural et al.

(10) Patent No.: US 11,879,806 B2
(45) Date of Patent: Jan. 23, 2024

(54) METHOD FOR PERFORMING A TEST RUN ON A TEST STAND (71) Applicant: AVL LIST GMBH, Graz (AT)

(72) Inventors: Emre Kural, Graz (AT); Andreas Fleck, Maria Enzersdorf (AT)

(73) Assignee: AVL LIST GMBH, Graz (AT)

( * ) Notice: Subject to any disclaimer, the term of this patent is extended or adjusted under 35 U.S.C. 154(b) by 166 days.

(21) Appl. No.: 17/311,962

(22) PCT Filed: Dec. 9, 2019

(86) PCT No.: PCT/AT2019/060423
§ 371 (c)(1),
(2) Date: Jun. 8, 2021

(87) PCT Pub. No.: WO2020/118331
PCT Pub. Date: Jun. 18, 2020

(65) Prior Publication Data
US 2022/0065749 A1 Mar. 3, 2022

(30) Foreign Application Priority Data
Dec. 10, 2018 (AT) .............................. A 51093/2018

(51) Int. Cl.
*G01M 15/02* (2006.01)
*G05B 19/19* (2006.01)

(52) U.S. Cl.
CPC ............. *G01M 15/02* (2013.01); *G05B 19/19* (2013.01); *G05B 2219/35581* (2013.01)

(58) Field of Classification Search
CPC ......... G05B 19/19; G05B 2219/35581; G01M 15/02
See application file for complete search history.

(56) References Cited

U.S. PATENT DOCUMENTS 7,668,706 B2 * 2/2010 Schoeggl ............ G01M 17/007
703/8
8,434,352 B2 * 5/2013 Dank ...................... G06Q 30/06
73/116.04

(Continued)

FOREIGN PATENT DOCUMENTS

CN 102047094 A 5/2011
CN 103998276 A 8/2014
(Continued)

OTHER PUBLICATIONS

Daniel Collins: "How are servo system velocity control loops tuned?", Jun. 6, 2017 (Jun. 6, 2017), XP055672868, Retrieved from the Internet <URL:https://web.archive.org/web/20170606142648/http://www.motioncontroltips.com/how-are-servo-system-velocity-control-loops-tuned/> [retrieved on Mar. 2, 2020].

(Continued)

*Primary Examiner* — Eric S. McCall
(74) *Attorney, Agent, or Firm* — Dykema Gossett PLLC (57) ABSTRACT

Various embodiments of the present disclosure are directed to a method for carrying out a test run on a test stand. The method in some embodiments reduces a deviation between a comparison simulation value and a comparison reference value when carrying out a test run on a test stand with a test object by simulating via a simulation unit a number of simulation values using a number of specified reference values starting from a selected reference value, determining a corrected reference value which is specified to the simulation unit for simulating a corrected simulation value and determining at least one setpoint variable using the corrected simulation value.

20 Claims, 5 Drawing Sheets (56) References Cited

U.S. PATENT DOCUMENTS

| | | | |
|---|---|---|---|
| 10,120,356 B2 | 11/2018 | Koo | |
| 11,255,749 B2* | 2/2022 | Kokal | G06F 5/06 |
| 2010/0191515 A1* | 7/2010 | Walenta | G01M 17/00 |
| | | | 703/6 |
| 2011/0066291 A1 | 3/2011 | Takashi | |
| 2015/0081045 A1 | 3/2015 | Fricke | |
| 2016/0209297 A1* | 7/2016 | Düser | G01M 17/0072 |
| 2018/0143101 A1* | 5/2018 | Pfister | G01M 17/0074 |
| 2019/0011329 A1* | 1/2019 | Merl | G01M 17/007 |
| 2020/0348209 A1* | 11/2020 | Pfister | G01M 15/04 |
| 2021/0190633 A1* | 6/2021 | Signor | G01M 13/025 |

FOREIGN PATENT DOCUMENTS

| | | | |
|---|---|---|---|
| CN | 105579824 A | 5/2016 | |
| CN | 107209083 A | 9/2017 | |
| DE | 102017106943 A1 | 5/2017 | |
| JP | 2014228440 A | 12/2014 | |

OTHER PUBLICATIONS

Kuperman A Ed—Karatza Helen et al: "Testing motion controllers robustness by emulating electrical and mechanical parameter variations of motor drives", Simulation Modelling Practice and Theory, Elsevier, Amsterdam, NL, vol. 19, No. 9, Apr. 20, 2011 (Apr. 20, 2011), pp. 1783-1794, XP028251957, ISSN: 1569-190X, [retrieved on Apr. 29, 2011], DOI: 10.1016/J.SIMPAT.2011.04.011.

* cited by examiner

METHOD FOR PERFORMING A TEST RUN ON A TEST STAND

CROSS-REFERENCE TO RELATED APPLICATIONS

This application is a national stage filing based upon International PCT Application No. PCT/AT2019/060423, filed 9 Dec. 2019, which claims the benefit of priority to Austria application No. A 51093/2018, filed 10 Dec. 2018.

BACKGROUND

The present invention relates to a method for carrying out a test run on a test stand with a test object, wherein a number of reference values is specified to a simulation unit by a reference unit, wherein a number of simulation values is simulated by the simulation unit using the number of reference values, wherein at least one setpoint variable and at least one control variable for controlling the test object is determined from the number of simulation values.

The present invention further relates to a test stand with a test object for carrying out a test run, wherein a reference unit is provided which specifies a number of reference values for a simulation unit, wherein the simulation unit is designed to simulate a number of simulation values using the number of reference values and to determine at least one setpoint variable from the number of simulation values and to transmit it to a control unit, wherein the control unit is designed to specify at least one control variable for controlling the test object based on the at least one setpoint variable.

There are legal specifications for permissible pollutant emissions from vehicles (in particular $CO_2$, CO, $NO_x$, and number of particles), e.g. Regulation (EC) No. 715/2007 of the European Parliament and of the Council, in which the Euro 5 and Euro 6 standards are defined. Compliance with these legal specifications by vehicles has so far been checked using standardized test cycles (such as the New European Driving Cycle (NEDC)) on test stands. For this purpose, the exhaust gas generated during the test cycle is taken from the test stand and examined. The problem in this case is that the conditions on the test stand under the standardized test cycle cannot be compared with the real conditions when the vehicle is moved on a real route. This means that a vehicle can adhere to the legal specifications on the test stand, but still exceed them in real operation.

In order to prevent this, the legislature is trying to relocate the verification of the specified pollutant emission limit values from the test stand to the real road. This requires the pollutant emissions to be measured and checked while the vehicle is actually driving on a real route using portable emission measurement systems (PEMS). There is no longer a standardized test cycle because driving on a public road with normal traffic is always subject to random influences. The aim of the legislature is that a vehicle complies with the limit values for pollutant emissions under normal operating conditions, and not just on the test stand. Legislators also give specifications for evaluating pollutant emissions after the test drive, e.g. the use of specific data analysis tools.

The legislature defines a real driving emissions (RDE) test procedure for this purpose. Only specific specifications for the vehicle mass, the ambient temperature, and the geographical altitude at which the test drive must take place, are specified. In addition, the percentage of different driving situations that must be included in the test procedure is also defined, for example, 33%±10% division into city, country, and motorway but in each case at least 16 km, vehicle speed country in the range of 60-90 km/h, length of the test drive 90-120 min, etc. Since this check is to take place on a public road, the test drive is in each case also subject to random influences, such as other traffic, positioning, and switching phases of traffic lights, etc. From this, it is immediately recognizable that a real test drive cannot be reproduced, but rather represents a more or less random chain of events.

This paradigm shift also has a direct impact on vehicle manufacturers when developing new vehicles and, in particular, new engines. So far, every development step could be checked using the standardized test cycles on the test stand. All that was needed was to subject the respective test object to the test cycle after each development step and to examine the pollutant emissions. This is no longer possible with the new RDE test procedure, as it is fundamentally impossible to predict whether a newly developed vehicle will survive the RDE test procedure at the end of its development by complying with the limit values for pollutant emissions. Only the finished vehicle can be moved on the real road, i.e. the RDE test procedure can only be carried out at the very end of development. If the vehicle does not pass this test, it would have enormous consequences on the vehicle manufacturer, who in the extreme case would have to re-roll at least some of the years of development at enormous costs and expense.

The use of the previous standardized test cycles during vehicle development does not help either since compliance with the limit values for pollutant emissions when using such standardized test cycles does not automatically ensure compliance with these limit values under the RDE test procedure.

It would now be possible to combine all possible operating states of a vehicle in a test scenario and use this test scenario to check each development step. However, this is hardly effective since the implementation of such a test scenario on a test stand would take a very long time, which would delay development, increase the expensive test stand times, and, overall, would be very time-consuming. An arbitrary creation of a test scenario is also not expedient, since it cannot ensure that compliance with the legal specifications under the RDE test procedure is achieved.

In addition, not every driving maneuver, e.g. acceleration from a low speed, overtaking on a country road, turning in city traffic, etc., has to have the same effect on pollutant emissions in every vehicle. This means that a test scenario can be suitable for a specific vehicle, but not for another vehicle.

In principle, the above also applies in the same way to other target variables in the development of a vehicle, for example for the consumption of a vehicle, although there are no (at least not yet) legal specifications. However, consumption is usually also a development goal when developing a vehicle, which is why the aim in this case is also to achieve the desired consumption, for example in the RDE test procedure.

For emission tests in practical driving operation, the real speed and the real position of a vehicle are recorded as the reference speed and the reference position over the reference time as a reference for driving maneuvers during real test drives. These reference values are made available by a reference unit during a simulation unit on a test stand and can also be processed before carrying out the simulation. The reference values can be varied and/or worst-case scenarios can be represented. If the simulation is carried out on a test stand, specific parts of the vehicle model, e.g. the engine or a drive train, can also be replaced by corresponding parts on the test stand.

A simulation of a vehicle has three basic building blocks: the simulated route, the simulated vehicle, and the simulated driver. The simulated driver controls the simulated vehicle along the simulated route at a simulation speed that should correspond to the specified reference speed. For this purpose, the simulated driver can stick to the reference time or to the reference position. However, slight deviations between the simulation speed and the reference speed cannot be prevented. The simulated route can also comprise the properties of the environment, such as temperature, air pressure, wind, "opposing" traffic, such as other vehicles, etc.

If the simulation speed is specified on the basis of the reference time, slight deviations between the simulation speed and the reference speed will result in an accumulated deviation between the simulation position and the reference position. If during a simulation there is an accumulated position deviation of 20 m at a reference position of 80 km, for example, then this simulation position of 80 km and one meter has a relative error of only 0.025%. If the vehicle is to stop on a steep hill (i.e., simulation speed zero), for example to test emissions during a hill start, the simulated vehicle would already be at a simulation position of 80 km and 20 m with a supposed reference position of 80 km. If this simulation position is at a location on the route where there is no inclination, then a simulated stop and start of the vehicle would lead to incorrect results, in particular with regard to an emission measurement.

If the simulation speed is specified on the basis of the reference position, slight deviations between the simulation speed and the reference speed result in a deviation between the simulation time and the reference time. If, for example, a reference speed of 130 km/h is specified first and then the reference speed is reduced to 40 km/h at a specific reference time, for example due to a sharp curve at a motorway exit, and the simulation time deviates from the reference time by a few seconds, this would result in a speed of 130 k/m during the sharp turn. This in turn could result in problems in the simulation or reproduction, for example due to very high, incorrectly simulated, lateral accelerations. In addition, with a position-dependent simulation speed, no start can take place after a stop at a specific reference position, so the simulation remains stuck.

A time-based determination of a simulation speed thus causes deviations between the simulation position and the reference position; a position-based determination of the simulation speed causes deviations between the simulation time and the reference time.

It is therefore an object of the present invention to specify a method and a test stand, with a simulation being made possible in which the above-mentioned problems are avoided.

SUMMARY OF THE INVENTION

According to the invention, this object is achieved in that a deviation between a comparison simulation value from the number of simulation values and a comparison reference value from the number of reference values, preferably by a tolerance, is detected by a detection unit, wherein, when a deviation x is detected, starting from a selected reference value from the number of reference values, a corrected reference value is determined by a correction unit, the corrected reference value instead of the selected reference value being specified to the simulation unit for simulating a corrected simulation value, whereby the deviation is reduced, and the at least one setpoint variable is determined using the corrected simulation value.

The object is also achieved by a test stand on which a detection unit is provided which is designed to detect a deviation between a comparison simulation value from the number of simulation values and a comparison reference value from the number of reference values, preferably by a tolerance, wherein a correction unit is provided which, when a deviation is detected, is designed to determine a corrected reference value starting from a selected reference value from the number of reference values and to specify the corrected reference value instead of the selected reference value to the simulation unit for simulating a corrected simulation value, whereby the deviation is reduced and the at least one setpoint variable is determined using the corrected simulation value.

A comparison between a comparison simulation value and a comparison reference value which is equivalent to the comparison simulation value is therefore first carried out, i.e. a simulation position is, for example, compared with a reference position. Of course, a plurality of comparison simulation values can also be compared with associated comparison reference values in order to detect any deviations. If a deviation is detected between the comparison simulation value and the associated comparison reference value, according to the invention, it is not the comparison simulation value itself that is changed, but rather a selected reference value from the number of reference values is replaced with a corrected reference value, the selected reference value usually not corresponding to the comparison reference value. Since the simulation unit now calculates a corrected simulation value on the basis of the corrected reference value instead of the (uncorrected) simulation value, the deviation is reduced as a result. Thus, the at least one setpoint variable is determined using the corrected simulation value, whereby the at least one setpoint variable is also corrected.

The method or the detection unit or correction unit can thus also be integrated into an existing test stand. The selected reference value, which was previously made available to the simulation unit by the reference unit, is changed to a corrected reference value, which is then made available to the simulation unit instead of the originally selected reference value. The method does not have to be integrated on the test stand, but can also be retrofitted subsequently by connecting a corresponding detection unit or correction unit between the reference unit and the simulation unit. Since only the selected reference value is replaced by a corrected reference value, the method can be used on all test stands in which a number of reference values is specified in such a way to the simulation unit by a reference unit. The method can also be activated during a running simulation in order to reduce or eliminate a deviation. Activation of the method on test stands or the integration of the correction unit in test stands, which simulation units with more complex driver models, which require for example, predictive information such as speed and inclination information, is possible.

A further setpoint variable can also be specified for at least one loading machine connected to the test object using the corrected simulation value.

The method according to the invention can be carried out in one or more cycles of the test run.

The corrected reference value can advantageously be increased or decreased continuously, with which a rapid reduction in the deviation between the comparison simulation value and comparison reference value can take place without providing jumps in the selected reference value. The method according to the invention is thus carried out in a plurality of cycles of the test run.

The corrected reference value can be increased or decreased until no more deviation occurs. It can thus be achieved that the comparison simulation value corresponds to the comparison reference value.

The method is advantageously started at the beginning of the test run, with which deviations can be kept low or can be prevented from the beginning. Of course, the method can also be started when the simulation has already progressed and there may already be a greater deviation. The method can also be used on the test stand during operation, for example in order to make changes during the simulation, e.g. to evaluate a change in the driver or transmission value, or can be activated and deactivated multiple times during a test run.

The method can be carried out during the entire test run in order to entirely prevent a deviation or to keep it low, e.g. within a tolerance band. The method according to the invention is thus carried out in all cycles of the test run.

The number of reference values preferably comprises a reference position at a reference time and a reference speed at the reference time, the number of simulation values simulated by the simulation unit comprising a simulation speed at a simulation time and a simulation position at the simulation time. Thus, the reference speed at the reference time is specified to the simulation unit by the reference unit, whereupon the simulation unit simulates the simulation speed as well as a simulation position at a simulation time.

The simulation position can serve as a comparison simulation value, the reference position can serve as a comparison reference value, and the reference speed can serve as a selected reference value.

Furthermore, a corrected reference speed that is smaller than the reference speed is specified to the simulation unit if the simulation position is greater than the reference position and the simulation speed exceeds a speed threshold, preferably zero.

Also, a corrected reference speed that is greater than the reference speed is specified to the simulation unit if the simulation position is smaller than the reference position and the simulation speed exceeds a speed threshold, preferably zero.

The spatial deviation of the simulation position from the reference position is thus regarded as the deviation between the comparison simulation value and the equivalent comparison reference value. The reference speed (selected reference value) is replaced by a corrected reference speed (corrected reference value) that is higher or lower than the reference speed. As a result, a simulation position is of course no longer simulated in the simulation unit as before, but a corrected simulation position (corrected simulation value), which reduces the deviation. As a result, the at least one setpoint variable and furthermore the at least one control variable are specified using the corrected simulation position.

The simulation time is preferably changed to a corrected simulation time if it deviates from the reference time and the simulation speed does not exceed the speed threshold, preferably zero. For example, the simulation time can be accelerated or slowed down and be thus adapted to the reference time.

The speed threshold can be selected in such a way that a change in the simulation time has no significant influence on the simulation. This is particularly the case when the speed threshold is at zero, in the range from zero to 6 km/h, or between 3 and 6 km/h, i.e. the vehicle is stationary in a stop phase or is moving slowly. Thus, only the length of this stopping phase is adjusted. This solves a singularity problem that occurs when only the simulation position is adjusted since the simulation position cannot increase at a simulation speed of zero. Since many stop phases in which the vehicle does not move are specified by the reference unit, in particular in RDE tests, deviations that have already accumulated, e.g. time deviations and/or position deviations, can be reduced, ideally to zero, by changing the duration of these stop phases by changing the simulation time. In this way, a position deviation can also be corrected by previously correcting a time deviation.

BRIEF DESCRIPTION OF THE DRAWINGS

The present invention is described in greater detail in the following with reference to FIGS. 1 to 7, which show advantageous embodiments of the invention by way of example, schematically, and in a non-limiting manner. In the drawings.

DETAILED DESCRIPTION

Figure 1A:
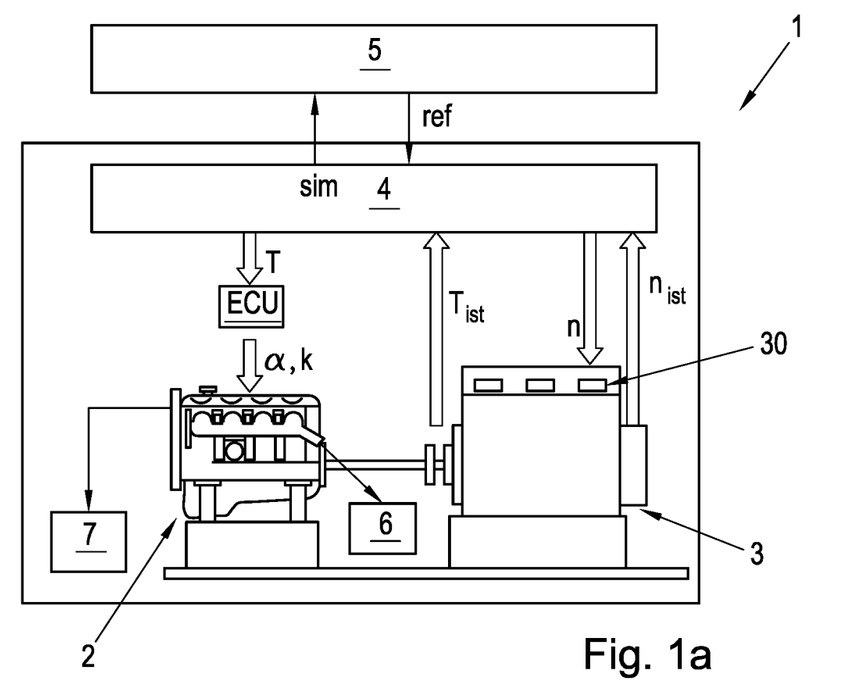
FIG. 1a shows a typical test stand setup for a test object.

FIG. 1 shows a typical test stand 1 for a test object 2, in this case an engine test stand for an internal combustion engine. The test object 2 is connected to a loading machine 3 in this case, for example via a connecting shaft, as indicated in FIG. 1. The test object 2 can, however, also comprise a drive train, an entire vehicle, individual or multiple components, such as gearboxes, batteries, etc. Accordingly, the test stand 1 can represent, for example, a drive train test stand or a roller test stand, it also being possible for more than one loading machine 3, for example one per driven semi-axis or also per axis, to be provided. The test object 2 is operated on the test stand 1 according to the specifications of a test run in order to obtain statements regarding specific measured variables m of the vehicle, such as the pollutant emissions, consumption, the acoustic behavior of the vehicle, the drivability of the vehicle, the durability of the vehicle, notifications on the design/optimization of individual components, etc. In this context, the measured variable is compared with a target variable. If the measured variable relates to the pollutant emissions of an internal combustion engine or the consumption of an internal combustion engine, the test object 2 naturally also comprises an internal combustion engine.

A vehicle moving on a test track is simulated on a simulation unit 4. For this purpose, a number of reference values ref is specified to the simulation unit 4 by a reference unit 5. The simulation unit 4 determines a number of simulation values sim as part of the simulation. In the simulation unit 4, again at least one setpoint variable T, for example a torque, is determined from the number of simulation values sim, the at least one setpoint variable T being able to also correspond to a simulation value sim. The at least one setpoint variable T can also represent a pedal position of an accelerator pedal or can be calculated from a pedal position. The at least one setpoint variable T is transferred to a control unit ECU; the control unit ECU also controls the test object 2 based on the at least one setpoint variable T with at least one control variable. The control unit ECU, designed in this case as an engine control unit, can specify a throttle valve position a and/or a fuel quantity k (control variable) for the test object 2 based on a torque to be generated (setpoint variable T).

The simulation unit 4 can also feed at least one further setpoint variable, for example a speed n, to a further control unit 30, the further control unit 30 being able to control a loading machine 3, as shown in FIG. 1. The actual speed of the loading machine 3 acts in this case from the loading machine 3 via the shaft on the test object 2.

Driving robots can also be provided on a roller test stand, which actuate the vehicle's operating elements, such as the accelerator pedal, brake pedal, gear shift, in accordance with the specifications of the test to be carried out.

On the test stand 1, a number of measuring sensors (not shown in detail) is usually provided, with which, for example, actual values of the torque $T_{ist}$ and the rotational speed $n_{ist}$ of the test object 2 can be detected and transmitted to the simulation unit 4.

At the test stand 1, a test run is carried out with a specific test object 2 and, for example, pollutant emissions are measured as a measured variable. Depending on the measured variable, corresponding measuring units, such as an emissions measuring unit 6, which is supplied with exhaust gas of the internal combustion engine and which measures the specific pollutant emissions such as $CO_2$, CO, $NO_x$, total mass of hydrocarbons (THC), and/or the number of particles (such as soot particles) and/or a consumption measuring unit 7, which measures the fuel consumption of the internal combustion engine, can be provided on the test stand 1.

Figure 1B:
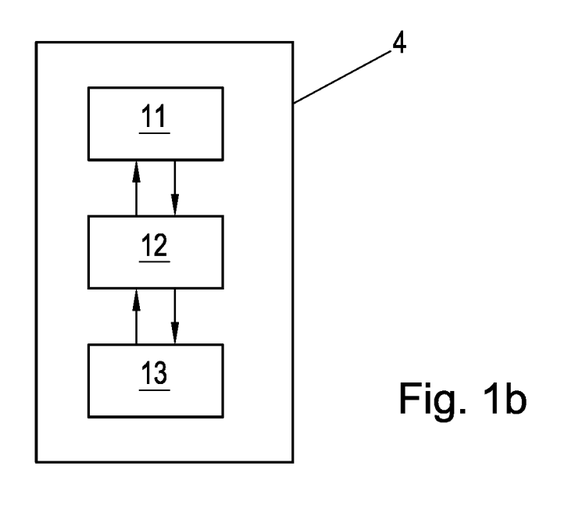
FIG. 1b shows a possible execution of the simulation unit.

The simulation unit 4 and the control unit ECU can also be designed as one unit or, as shown in FIG. 1, can be designed as independent units. The reference unit 5 is designed as an independent unit in FIG. 1, but can also be combined with the simulation unit 4. The simulation unit 4 has simulation hardware and/or simulation software with which the test drive of the vehicle is simulated. For this purpose, a simulation model, which comprises, for example, a driver model 11, a vehicle model 12, and a route model 13, is implemented in the simulation unit 4. Further models, such as a tire model, a road model, etc., can also be implemented. The simulation unit 4 thus simulates the drive of a virtual vehicle (vehicle model 12), which is controlled by a virtual driver (driver model 11), along a virtual test route (environment model 13), specific events such as traffic signs, traffic lights, foreign traffic, etc., being able to be simulated. Events are perceived by the virtual driver in the driver model 11 and implemented in the form of appropriate reactions. Part of the vehicle, such as the internal combustion engine or a drive train, is physically constructed as real hardware on the test stand 1 as the test object 2 and is operated with the specifications of the simulation according to the test on the test stand 1. This procedure for carrying out a test is well known and is often referred to as an X-In-The-Loop test, where the "X" stands for the respective test object 2 that is actually present. This type of test execution is very flexible and can come very close to the character of a real test drive with a real vehicle. Variations for worst-case estimates can also be made and evaluated. Variations can be defined very abstractly, e.g. in the form of more vehicle mass, more traffic, strong headwind, more aggressive driving behavior, etc.

With the test run created in this way, the development of the vehicle can therefore be carried out in all development stages and the probability of compliance with specific specifications of the target variable, for example legal limit values for pollutant emissions during a check with an RDE test procedure, can be significantly increased. The same applies in an analogous manner to other measured variables, such as consumption, drivability, acoustic behavior, durability, instead of pollutant emissions.

The test run usually contains many different driving maneuvers, e.g. acceleration, deceleration, standstill, constant travel, cornering, etc. under specific boundary conditions, such as speed, torque, steering angle, road gradient, traffic, etc. understood. As driving maneuvers, starting from standstill, accelerating out of a curve, changing the vehicle speed, overtaking a slow vehicle, coasting to a red light, etc. can be implemented. Every drive of a vehicle and thus also a test run can be seen as a chronological sequence of such driving maneuvers. It is immediately evident that there can be an abundance of such driving maneuvers. The driving maneuvers are stored in the reference unit 5 and come, for example, from real, measured test drives, from simulations that have already been carried out, etc.

A test run is now created as a time sequence of such driving maneuvers. This can be done manually by a user, by randomly selecting the driving maneuvers or by a specific selection. The driving maneuvers must of course be linked to one another in such a way that there are no discontinuities, such as sudden jumps in speed, during the test run. It must also be ensured that the test object 2 can follow the desired specifications in combination with the simulation model. The test run should include many different driving maneuvers, which should preferably cover the largest possible operating range (speed, torque) of the vehicle.

Thus, there can be precise specifications as to which maneuvers must be included in which proportions.

The simulation unit 4 receives, as mentioned, a number of reference values ref from the reference unit 5 corresponding to the currently desired driving maneuver within the scope of the test run for carrying out the simulation. A reference speed v_ref and a reference position s_ref, in each case as a function of the reference time t_ref, serve as reference values ref. A reference speed v_ref corresponding to the test run is thus specified to the simulation unit 4, which reference speed is simulated by the driver model 11, for example. The driver model 11 thus follows the reference speed v_ref which is calculated using the vehicle model 12 and the route model 13.

The test run or the individual driving maneuvers are specified in the reference unit 5 as the course of the reference speed v_ref over the reference time t_ref and are transmitted to the simulation unit 4 as reference values ref. In the context of the simulation, the simulation unit 4 tries to follow the reference speed v_ref with a simulation speed v_sim. This can be location-based (i.e., the simulation speed v_sim at the simulation position s_sim always corresponds to the reference speed v_ref at the reference position s_ref) or time-based (i.e., the simulation speed v_sim at the simulation time t_sim always corresponds to the reference speed v_ref at the reference time t_ref). However, since the simulation speed v_sim can never exactly follow the reference speed v_ref, a time deviation arises in the case of a location-based approach and a position deviation in a time-based approach.

FIGS. 2, 3, 4, 6, and 7 show in each case a time-speed-path diagram, the time t being plotted on the positive abscissa, the speed v on the negative abscissa, and the position s on the positive ordinate. This results in a speed-time relationship in the left part of the diagram and a distance-time relationship in the right part of the diagram.

Figure 2:
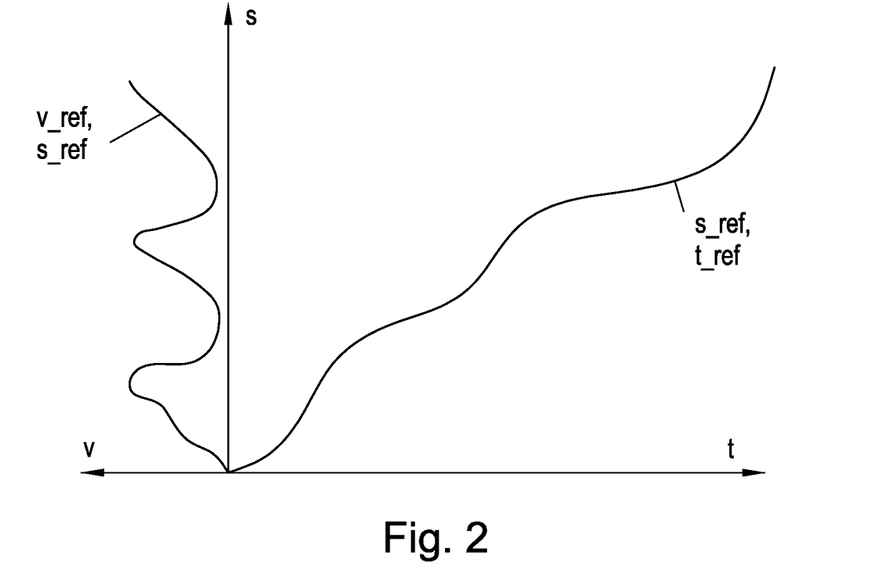
FIG. 2 shows a reference drive by way of example.

In FIG. 2, a reference drive results from corresponding reference values ref: A reference speed v_ref is specified for each reference time t_ref and a reference position s_ref is also specified for each reference time t_ref, with which the reference curves are formed in each case: On the left, a reference speed v_ref as a function of the reference position s_ref and, on the right, a reference position s_ref at the reference time t_ref. As a result of this relationship, a reference speed v_ref is also specified for each reference time t_ref.

Figure 3:
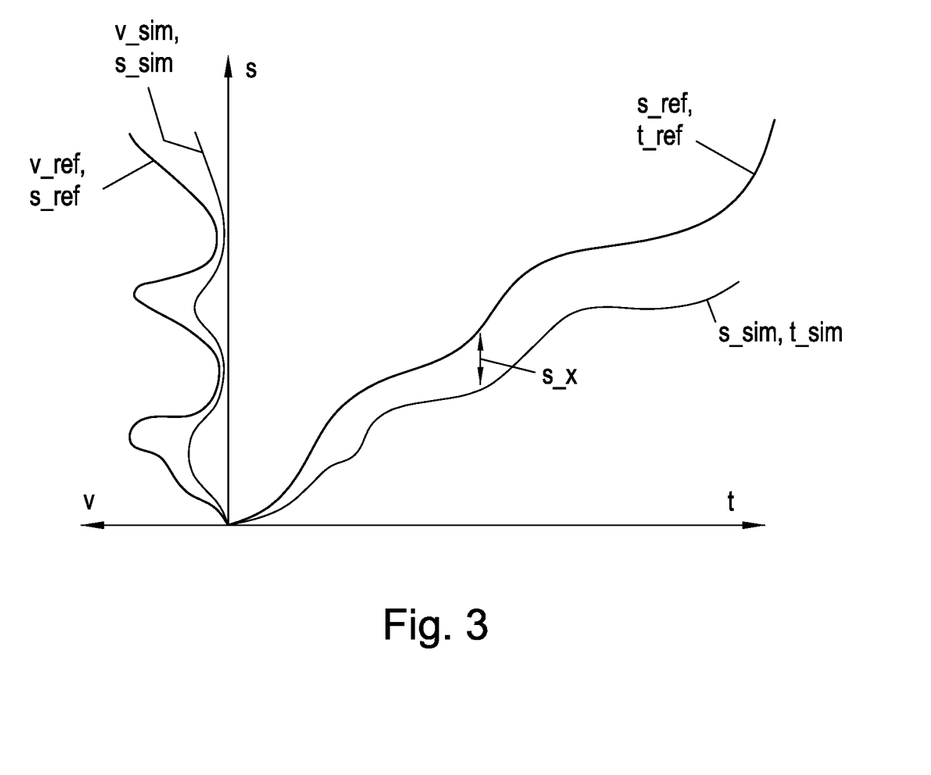
FIG. 3 shows a time-based specification of the simulation speed.

In addition to the reference values ref, FIG. 3 shows the simulation values sim of a simulation, with a time-based specification of the simulation speed v_sim taking place. The simulation speed v_sim thus follows the reference speed v_ref at every point in time of the simulation time t_sim. Since the simulation speed v_sim cannot follow the reference speed v_ref exactly, there is nevertheless a speed deviation v_x between the simulation speed v_sim and the reference speed v_ref, as can be seen in the left quadrant of the graph. The simulation speed v_sim is too low in this case. As a result, a spatial deviation s_x between the simulation position s_sim and the reference position s_ref results as the deviation x, as can be seen in the right part of the graph.

Figure 4:
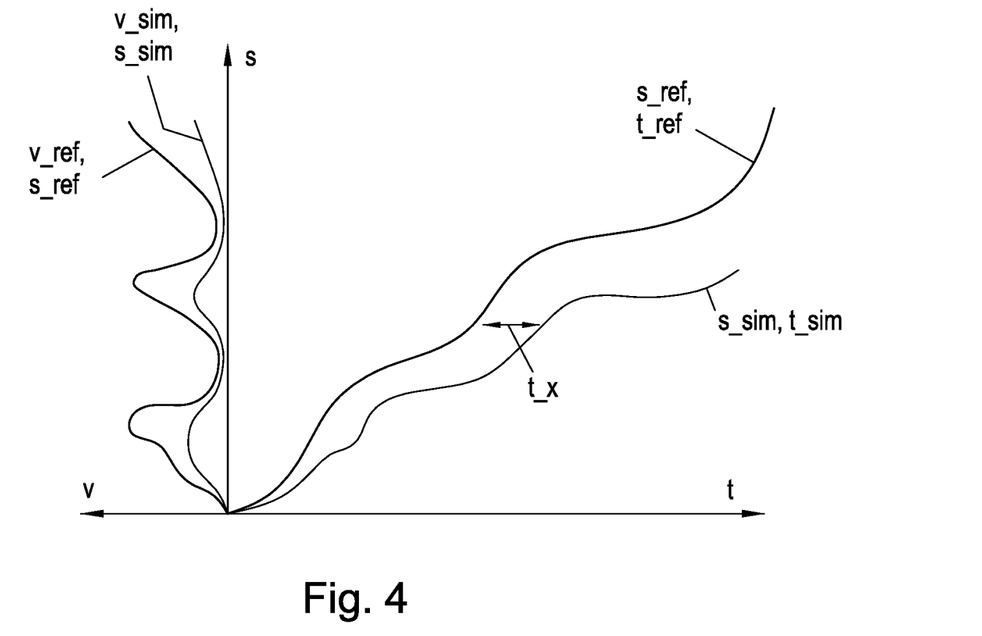
FIG. 4 shows a location-based specification of the simulation speed.

FIG. 4 shows simulation values sim which are determined via a location-based specification of the simulation speed v_sim. The simulation speed v_sim thus follows the reference position s_ref at every point of the simulation position s_sim. Since the simulation speed v_sim again cannot follow the reference speed v_ref exactly, there is also a speed deviation v_x between the simulation speed v_sim and the reference speed v_ref (again shown by way of example as too low a simulation speed v_sim), which is why a time deviation t_x between the simulation time t_sim and the reference time t_ref results as the deviation x.

Figure 5:
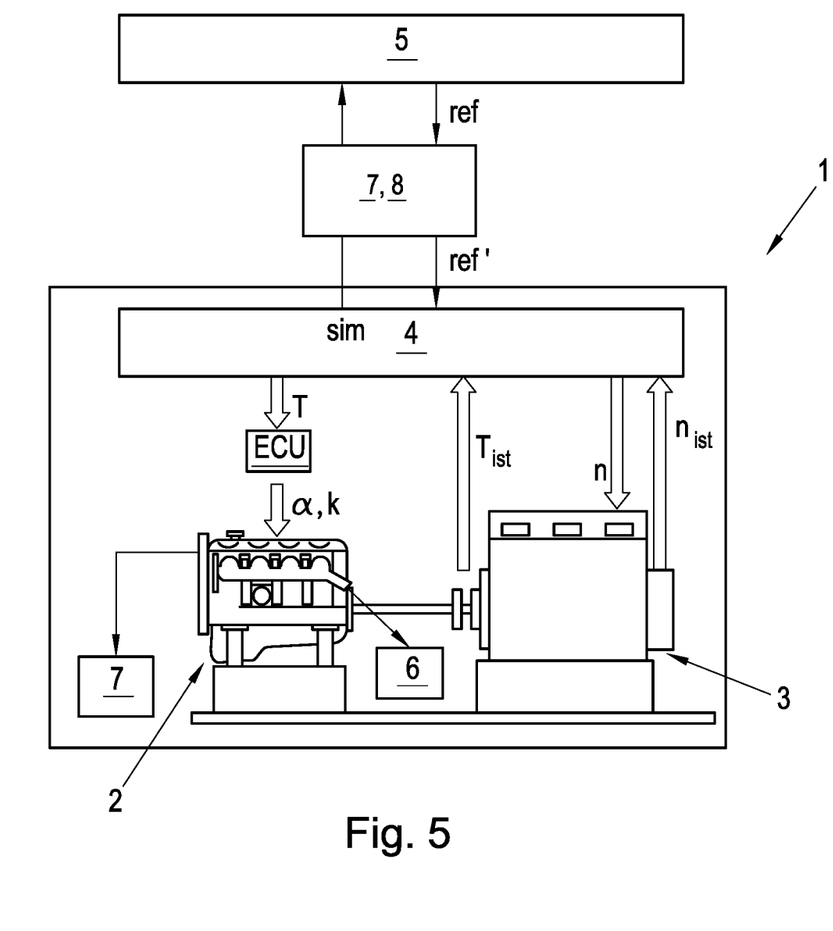
FIG. 5 shows a test stand setup according to the invention.

As can be seen in FIG. 5, according to the invention, a detection unit 7 and a correction unit 8 are provided on the test stand 1, which are connected in this case as a unit between the simulation unit 4 and the reference unit 5. This is particularly advantageous because it does not intervene in the simulation unit 4 itself; only the corresponding simulation values sim need to be available in order to compare them with the equivalent reference values ref. In FIG. 5, the simulation position s_sim is fed to the detection unit 7 from the simulation unit 4.

The deviation x between a comparison simulation value and a comparison reference value is now determined by means of a detection unit 7. In this case, the spatial deviation s_x between the simulation position s_sim as a comparison simulation value and the reference position s_ref as a comparison reference value is determined as the deviation x. Of course, a tolerance (band) can be provided. By means of the correction unit 8 advantageously integrated in this case into the detection unit 7, the reference speed v_ref is changed as selected reference value ref to the corrected reference speed v_ref', which is then made available instead of the reference speed v_ref to the simulation unit 4. A corrected simulation position s_sim' is thus simulated in the simulation unit 4 in the further course, which results in a smaller spatial deviation s_x.

Figure 6:
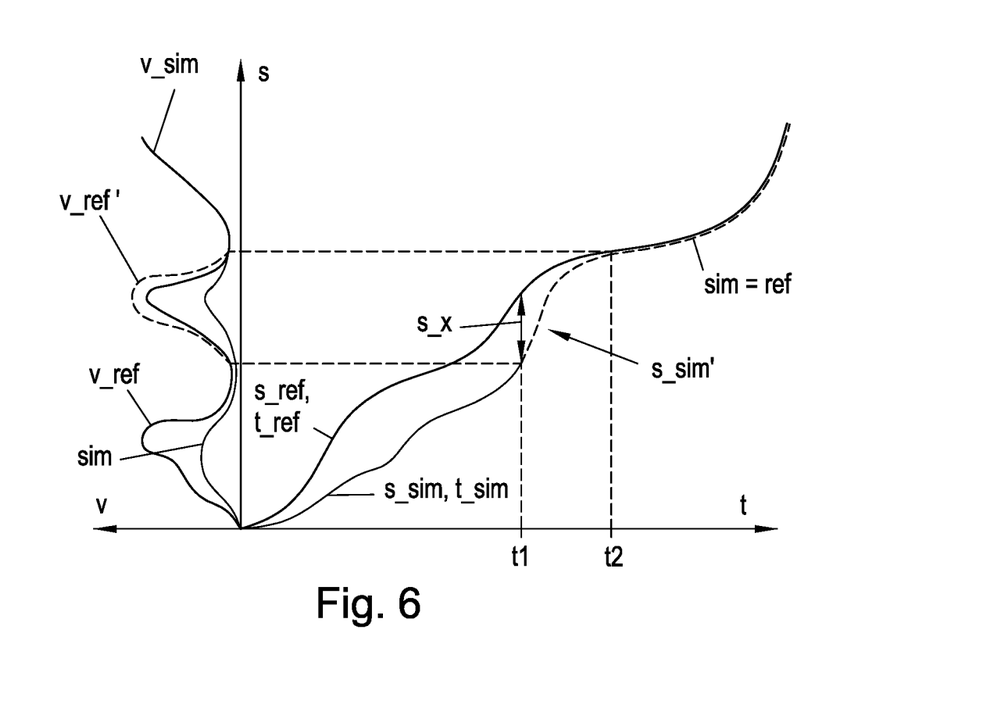
FIG. 6 shows a correction according to the invention of the reference speed.

In FIG. 6, a spatial deviation s_x, in this case a simulation position s_sim that is too small compared to the reference position s_ref, is recognized at the point in time t1. This spatial deviation s_x can arise because the simulation speed v_sim is too low, as is also indicated in the present drawings. Compared to FIG. 4, it can be seen that after the point in time t1 of the simulation unit 4, instead of the reference speed v_ref (as selected reference value ref) a corrected reference speed v_ref', which is higher in this case, is specified, which is shown by the dashed portion. Based on this, a higher simulation speed v_sim is simulated in the simulation unit 4 since this follows the now corrected reference speed v_ref'. The corrected reference value ref (in this case the corrected reference speed v_ref) can be continuously increased or decreased.

As a result, starting from the time t1, instead of the simulation speed v_sim, the corrected simulation speed v_sim' is specified to the simulation unit 4 and the spatial deviation s_x is thus reduced; in the illustrated case no more spatial deviation s_x occurs until time t2. The corrected reference speed v_ref is then retained in order to keep the spatial deviation s_x at zero. The simulation speed v_sim thus roughly follows the reference speed v_ref and the simulation position s_sim follows the reference position s_ref.

This has the consequence that the simulation unit 4, using the at least one corrected simulation value sim', forwards at least one setpoint variable T, which is now corrected, to the control unit ECU. Using this at least one setpoint variable T, the control unit ECU controls the test object 2 with at least one control variable that is also corrected. Using the corrected simulation value sim', at least one further setpoint variable n can also be determined for the further control unit 30 of the loading machine 3.

The method could of course also be started at the beginning of the test run and preferably be carried out during the entire test run. A slight deviation x thus occurs during the simulation since this is preferably corrected continuously and as best as possible.

However, it has to be always ensured in the present embodiment that the simulation speed v_sim exceeds a first speed threshold for a reduction of the reference speed v_ref (as selected reference value ref) to a corrected reference speed v_ref. For an increase in the reference speed v_ref, it must also be ensured that the simulation speed v_sim exceeds the speed threshold. In particular, the simulation speed v_sim must not be zero in this case.

At low reference speeds v_ref and thus also low simulation speeds v_sim, the possibility of a correction by adapting the reference speed v_ref as selected reference value ref is low, in particular if the simulation position s_sim is greater than the reference position s_ref. Since the reference speed v_ref is low, it can of course no longer be reduced much before it reaches zero.

Figure 7:
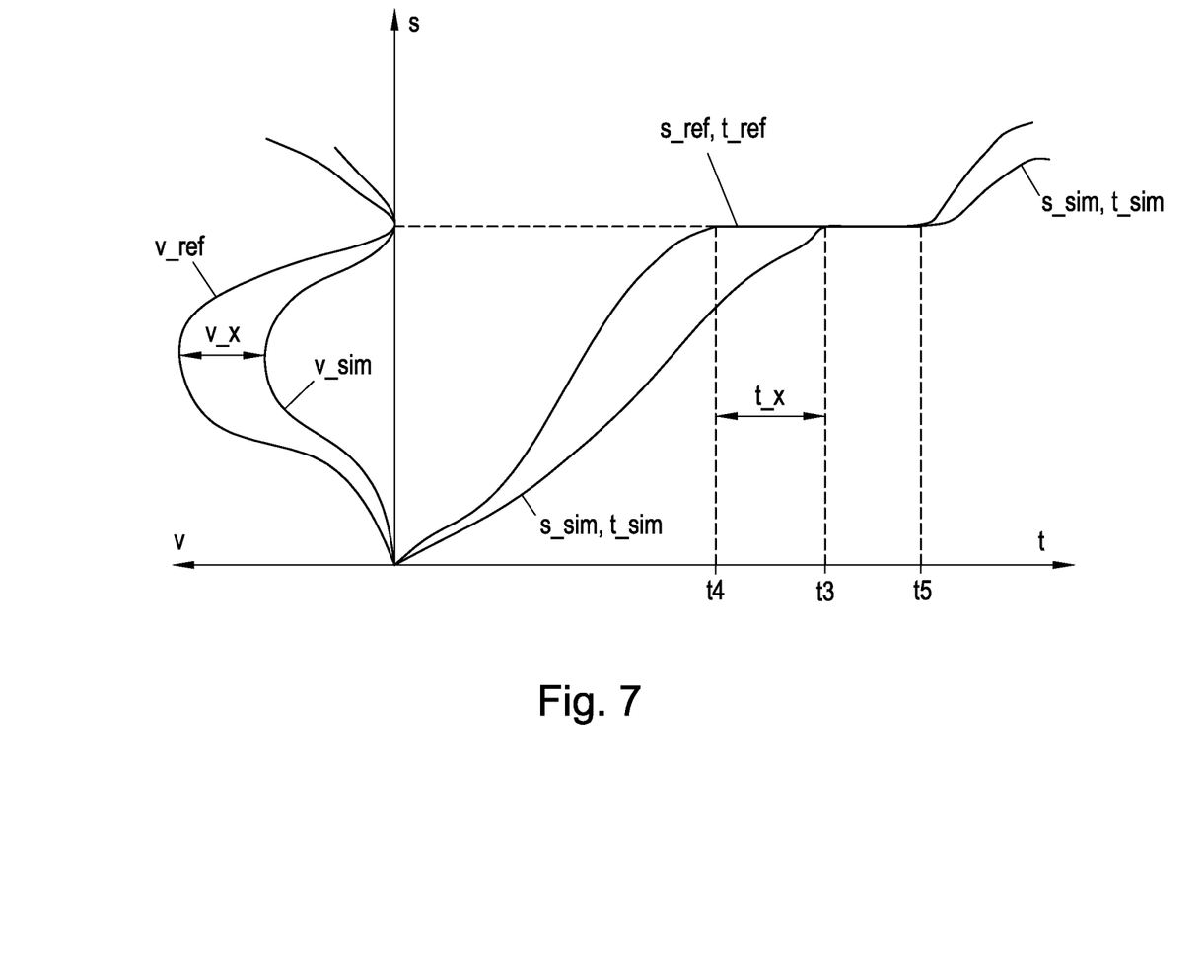
FIG. 7 shows a correction according to the invention of the simulation time in a stop phase.

In FIG. 7, the reference speed v_ref becomes zero at the time t4. Since a time deviation t_x occurs, the simulation speed v_sim does not become zero until the time t3. Thus, the speed threshold (of zero) is reached at the time t3 by the simulation speed v_sim, with which the speed threshold is no longer exceeded, which is preferably recognized by the detection unit 7. The simulation time t_sim which deviates from the reference time t_ref is thus changed, preferably by the correction unit 8. At the time t5, the reference speed v_ref and thus the simulation speed v_sim are increased again. So that these times are synchronized again, the duration in which the simulation speed v_sim is zero is reduced. In accordance with the reference, the stop duration would have to last from t4 to t5; in the simulation the stop duration was reduced to t3 to t5. The change in the simulation time t_sim can also be viewed as a faster or slower expiry of the simulation time t_sim or the reference time t_ref in the changed range of the simulation time t_sim.

The invention claimed is:

1. Method for carrying out a test run on a test stand with a test object, the method including the steps of:
    defining a number of reference values with a reference unit and providing the reference values to a simulation unit,
    simulating the test object moving on a test track and generating a number of simulation values with the simulation unit using the number of reference values, wherein at least one setpoint variable and at least one control variable for controlling the test object is determined from the number of simulation values,
    detecting, via a detection unit, a deviation between a comparison simulation value from the number of simulation values and a comparison reference value from the number of reference values,
    when the deviation is detected, determining a corrected reference value, via a correction unit, starting from a selected reference value from the number of reference values,
    defining the corrected reference value for the simulation unit, wherein the simulation unit uses the corrected reference value instead of the selected reference value to generate a corrected simulation value, and
    determining at least one corrected setpoint variable using the corrected simulation value.

2. The method according to claim 1, further including the step of determining at least one further setpoint variable for at least one loading machine connected to the test object using the at least one corrected simulation value.

3. The method according to claim 1, further including the step of continuously increasing or decreasing the corrected reference value.

4. The method according to claim 1, further including the step of increasing or decreasing the corrected reference value until no more deviation occurs.

5. The method of claim 1, wherein the step of detecting a deviation between a comparison simulation value from the number of simulation values and a comparison reference value from the number of reference values further includes utilizing a tolerance.

6. The method of claim 1, wherein the selected reference value differs from the comparison reference value, and wherein the corrected reference value is increased or reduced in comparison to the selected reference value depending on the detected deviation.

7. The method of claim 1, wherein the comparison simulation value is equivalent to the comparison reference value.

8. The method according to claim 1, characterized in that the steps of the method are started at the beginning of the test run.

9. The method according to claim 8, characterized in that the steps of the method are carried out during the entire test run.

10. The method according to claim 1, characterized in that the number of reference values includes a reference position at a reference time and a reference speed at the reference time, in that the number of simulation values simulated by the simulation unit includes a simulation speed at a simulation time and a simulation position at the simulation time.

11. The method according to claim 10, characterized in that the simulation position serves as a comparison simulation value, the reference position serves as a comparison reference value, and the reference speed serves as the selected reference value.

12. The method according to claim 11, characterized in that a corrected reference speed that is greater than the reference speed is generated by the simulation unit if the simulation position is smaller than the reference position and the simulation speed exceeds a speed threshold.

13. The method of claim 12, wherein the speed threshold is zero.

14. The method according to claim 11, characterized in that a corrected reference speed that is lower than the reference speed is generated by the simulation unit if the simulation position is greater than the reference position and the simulation speed exceeds a speed threshold.

15. The method of claim 14, wherein the speed threshold is zero.

16. The method according to claim 14, further including the step of changing the simulation time to a corrected simulation time if the simulation time deviates from the reference time and the simulation speed does not exceed the speed threshold.

17. The method of claim 16, wherein the speed threshold is zero.

18. Test stand with a test object for carrying out a test run, the test stand comprising:
    a reference unit configured and arranged to define a number of reference values and to transmit the number of reference values to a simulation unit,
    the simulation unit configured and arranged to:
        generate a number of simulation values using the number of reference values,
        determine at least one setpoint variable from the number of simulation values and
        transmit the at least one setpoint variable to a control unit,
    the control unit configured and arranged to define at least one control variable for controlling the test object based on the at least one setpoint variable,
    a detection unit configured and arranged to detect a deviation between a comparison simulation value from the number of simulation values and a comparison reference value from the number of reference values, and
    a correction unit configured and arranged to determine a corrected reference value starting from a selected reference value from the number of reference values, when a deviation is detected, and to define the corrected reference value instead of the selected reference value for the simulation unit for generating a corrected simulation value, to determine at least one corrected setpoint variable using the corrected simulation value.

19. The test stand of claim 18, wherein the detection unit is further configured and arranged to utilize a tolerance in the detection of the deviation between the comparison simulation value from the number of simulation values and the comparison reference value from the number of reference values.

20. The test stand of claim 18, wherein the selected reference value differs from the comparison reference value, and wherein the corrected reference value is increased or reduced in comparison to the selected reference value depending on the detected deviation.

* * * * *